United States Patent [19]

Betts et al.

[11] Patent Number: 4,952,254

[45] Date of Patent: Aug. 28, 1990

[54] HIGH IMPULSE, NON-DETONABLE PROPELLANT

[75] Inventors: Robert E. Betts, Huntsville; Lawrence B. Thorn, Madison; William S. Melvin, Huntsville, all of Ala.

[73] Assignee: The United States of America as represented by the Secretary of the Army, Washington, D.C.

[21] Appl. No.: 390,144

[22] Filed: Aug. 7, 1989

[51] Int. Cl.$^5$ ............................................. C06B 45/10
[52] U.S. Cl. .................................. 149/19.4; 149/19.9; 149/19.92; 149/109.6; 264/3.1; 264/3.4
[58] Field of Search .................. 149/19.4, 19.9, 19.92, 149/109.6; 264/3.1, 3.4

[56] References Cited

U.S. PATENT DOCUMENTS

| | | | |
|---|---|---|---|
| 3,655,836 | 4/1972 | Dehm et al. | 264/3.1 |
| 3,702,272 | 11/1972 | McDonnell et al. | 264/3.1 |
| 3,951,706 | 4/1976 | Eldridge | 149/19.92 |
| 4,092,189 | 5/1978 | Betts | 149/19.2 |
| 4,425,170 | 1/1984 | Jones | 149/109.6 |
| 4,462,848 | 7/1984 | Elrick | 149/19.92 |
| 4,521,260 | 6/1985 | Johnson et al. | 149/19.9 |
| 4,655,858 | 4/1987 | Sayles | 149/19.92 |

Primary Examiner—Edward A. Miller
Attorney, Agent, or Firm—Freddie M. Bush; James T. Deaton

[57] ABSTRACT

A high impulse, non-detonable solid propellant grain is prepared from a cured detonable proepllant composition having a small critical diameter of less than one inch and an uncured detonable propellant composition having a large critical diameter of several inches. The method of preparation comprises grinding or cutting the cured detonable propellant composition into granules less than its critical diameter in any direction. An uncured propellant composition, in a predetermined amount of les than its critical diameter, is prepared, and the granules of the cured propellant are added and blended with the uncured propellant composition (which serves as the propellant binder) to form a homogeneous propellant blend. The homogeneous propellant blend is cured to yield a high impulse, non-detonable solid propellant grain having a critical diameter less than the critical diameter of the uncured propellant composition.

3 Claims, 1 Drawing Sheet

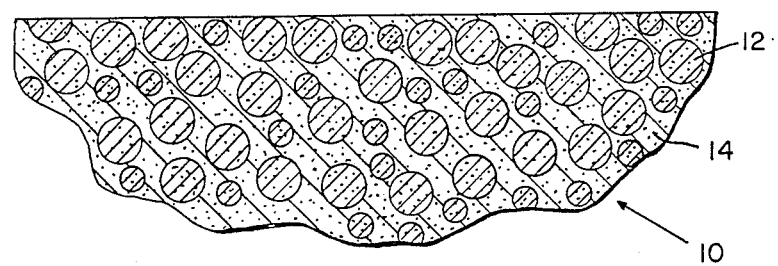

HIGH IMPULSE, NON-DETONABLE PROPELLANT

DEDICATORY CLAUSE

The invention described herein may be manufactured, used, and licensed by or for the Government for governmental purposes without the payment to us of any royalties thereon.

BACKGROUND OF THE INVENTION

The determinations of failure diameters of solid propellants containing predominately ammonium perchlorate and rubber indicated large failure diameters. Thus, it was apparent that testing propellants of large size diameters at full scale would prove to be very expensive, notwithstanding the impact that such testing would have on environmental and safety aspects. Therefore, the need for a coordinated test program was recognized. Consequently the major testing which was completed in the mid-sixties under a program "Standard Propellant Hazards" (SOPHY), which was termed the failure diameter project to end all propellant failure diameter testing, produced such predictable results that the SOPHY predictions can be used to good purpose for many similar propellant formulations to even present times.

More recently, the method of further characterizing explosives and other energetic materials of many varied formulations such as propellant for many end uses comprise applying a shock wave to the energetic material under investigation by means of a known explosive charge. The method typically employs a donor charge in the form of a cylinder or cone which is placed on top of an acceptor charge which is the energetic material being investigated. Attenuators such as cards (plastics or paper) or water is sometimes placed between the donor and acceptor to quantify the succeptability of the acceptor. For example, an explosive pellet of tetryl (donor) is exploded against a sample of a rocket propellant (acceptor) with 1/16 inch cards or discs or plexiglass in between. If the propellant detonates with 50 cards in between but does not detonate with 60 cards in between then it is more sensitive to detonation than a propellant which will detonate at 30 cards but does not detonate at 40 cards.

For certain uses, an explosive charge has to be detonable but the detonable function can be influenced by a shape charge to control the focusing of the energy down the centerline from the shape charge to precisely produce desired results. The resulting structure could yield a penetrator action as needed for antitank-weapons or for a penetrator action as needed for defeating a barrier defense structure.

For certain uses, an energetic propellant grain must have a high specific impulse and good mechanical properties. An example of a method of preparing high burning rate solid propellant grains is disclosed in a commonly assigned U.S. Pat. No. 4,092,189. This patent issued to Robert E. Betts on May 30, 1978 and assigned to the United States of America as represented by the Secretary of the Army, Washington, D.C. is directed to good mechanical properties and high burning rate solid propellant grains prepared from a multimodal blend of at least on ultra-high burning rate propellant that has been cured and ground to a predetermined particle size of from about 100 microns (0.1 millimeter) to about 5 millimeters and at least one uncured propellant composition that has high tensile strength and compatibility with the ultrahigh burning rate propellant and that serves as a binder for the solid propellant grain when cured. Thus, the high burning rate is contributed by the ultra-high burning rate propellant while the high tensile strength is contributed by the propellant formulation having high tensile strength which serves as the binder.

A detonable explosive composition which has high energy would be desirable as the high energy portion of a propellant system; however, the detonable explosive composition portion would have to be attenuated to be safe for use in a propellant system.

SUMMARY OF THE INVENTION

An object of this invention is to provide a high impulse, non-detonable solid propellant grain. Another object of this invention is to provide a method for preparation of a high impulse, non-detonable solid propellant grain prepared from a predetermined amount of a cured first detonable composition and a predetermined amount of an uncured second detonable composition wherein the combination of the first and second detonable composition yields a high impulse, non-detonable solid propellant grain.

A further object of this invention is to provide a high impulse, non-detonable solid propellant composition prepared from the combination of two detonable compositions.

With the above objectives in mind, attention is now focused to a method of preparation of a high impulse, non-detonable propellant composition. This method comprises selecting a predetermined amount of a cured propellant composition having a small critical diameter and having a propensity to detonate from an induced shock wave, reducing the size of the cured propellant composition to a physical dimension less than its critical diameter, blending the reduced particles of the cured propellant composition with a predetermined amount of an uncured propellant composition having a large critical diameter and having a propensity to detonate from an induced shock wave, and curing the resulting combination to yield a high impulse, non-detonable propellant composition having a critical diameter less than the critical diameter of the uncured propellant composition.

An example of a high impulse, non-detonable propellant grain prepared by the described method is comprised of a cured propellant A having a critical diameter of less than one inch (e.g., 0.4 inch). Propellant A is cut or ground into granules or to granules less than its critical diameter in any direction less than 0.4 inch ( e.g., 0.05 inch). An uncured propellant B having a critical diameter of several inches (e.g., 12 inches) is employed in less than its critical diameter as the binder in making a propellant grain up to 10 inches, for example. Therefore, the propellant grain will have a critical diameter greater than 10 inches, and the resultant grain is a high impulse, nondetonable propellant grain.

BRIEF DESCRIPTION OF THE DRAWING

The FIGURE of the drawing illustrates a high impulse, non-detonable propellant grain less than its critical diameter which was prepared from two detonable propellant compositions in an amount of less than their respective critical diameters.

DESCRIPTION OF THE PREFERRED EMBODIMENT

The method of this invention comprises providing a cured detonable propellant composition A, as illustrated in Table I, for combining with an uncured detonable propellant Composition B, as also illustrated in Table I.

TABLE I

| Propellant Composition | Propellant State | Major Propellant Ingredients | Propellant Critical Diameter |
|---|---|---|---|
| A | Cured | Ammonium perchlorate (AP) Aluminium (Al) Clyclotrimethyle-netrinitramine (RDX) Binder of hydroxyl terminated polybutadiene (HTPB) Curing agent of a diissocyanate | 0.40 inch |
| B | Uncured | Ammonium nitrate (AN) Binder of hydroxyl terminated polybutadiene (HTPB) Curing agent of a diissocyanate | 12.00 inches |

Propellant A is formulated with a critical diameter of 0.40 inch which has the characteristic of being detonable when in this dimension in any direction when subjected to an explosive force such as supplied by a detonator which is a small explosive charge or by a donor charge. Propellant A is processed and cured in thin sheets or other geometries which facilitates the grinding after curing. It is essential that the reduced particle sizes of A be less than 0.40 inch in any direction. A predetermined quantity of ground, high impulse propellant A is added to a predetermined quantity of propellant B which is uncured and while B is being processed. The resulting mixture is blended to achieve a homogenous blend and then cured to yield a high impulse, non-detonable propellant grain.

In further reference to the Drawing, propellant grain 10, shown in sectional view, depicts particles 12 of propellant formulation A reduced to less than its critical diameter bound with binder 14, of propellant formulation B of less than its critical diameter in any direction. As further related to the illustrated examples of propellants A and B, it is essential that the finished propellant grain diameter be less than 12 inches equivalent of B and that the particle sizes of A be less than 0.40 inch. For example when the predetermined quantity of A and the predetermined quantity of B are mixed and cured to a diameter of 10 inches dimension, the finished grain will have a critical diameter of greater than 10 inches, and therefore, this size propellant grain will not detonate since it is less than the critical diameter. Propellant A has a much higher impulse than B; therefore, the propellant grain illustrated yields a greater impulse than propellant B but is not detonable when in combination with B which serves as the attenuating media while restricting B to less than its critical diameter. The advantages of combining two detonable propellant compositions A and B to yield a non-detonable composition are recognized for tactical uses. These advantages include achieving a high impulse and achieving reduced smoke.

Propellant B functions as an attenuating medium which ensure that propellant A is spaced apart to below its critical diameter. Also, the amount of propellant B is held to an amount in any direction which is less than its critical diameter while functioning as an attenuating and binder propellant for the resulting high impulse, non-detonable propellant grain also containing propellant-/composition A in particles less than its critical diameter in any direction.

The propellant formulations of the type propellants A and B, which have a small critical diameter and large critical diameter respectively, where it is desired to have a finished propellant grain with a high specific impulse, reduced smoke, and be non-detonable for a predetermined propellant grain diameter, should contain an amount from about 80 to about 96 weight percent of A and from about 20 to about 4 weight percent of B.

We claim:

1. A method of preparing a high impulse, non-detonable solid propellant grain from a first detonable propellant composition which is a cured propellant composition having a small critical diameter of less than one inch and having a propensity to detonate from an induced shock wave and a second detonable propellant composition which is an uncured propellant composition having a large critical diameter of at least several inches and having a propensity to detonate from an induced shock wave, said method comprising:
   (i) selecting a predetermined amount of said cured propellant composition having a small critical diameter of less than one inch;
   (ii) grinding or cutting said cured propellant composition into granules less than its critical diameter in any direction;
   (iii) preparing a predetermined amount of said uncured propellant composition which is less than the critical diameter of said orooellant having a large critical diameter of at least several inches, said uncured propellant composition serving as the binder and attenuator for said cured, solid propellant granules,
   (iv) adding an amount from about 80 to about 96 weight percent of said/cured propellant granules to an amount from about 20 to about 4 weight percent of said uncured propellant composition;
   (v) mixing said cured propellant granules and said uncured propellant composition to form a homogeneous propellant blend; and,
   (vi) curing said homogeneous blend to yield a high impulse, non-detonable solid propellant grain having a critical diameter less than said critical diameter of said uncured propellant composition and having granules of said cured propellant composition having less than a critical diameter in any direction dispersed within said propellant composition having a large critical diameter.

2. A high impulse, non-detonable solid propellant grain prepared by the method of claim 1 wherein said first detonable propellant composition has a critical diameter of about 0.40 inch or less, wherein said second detonable propellant composition has a critical diameter of about 12 inches or more, and wherein said cured propellant grain has a diameter of about 10.00 inches with a critical diameter of greater than 10.00 inches, said propellant grain being nondetonable.

3. The high impulse, non-detonable solid propellant grain of claim 2 wherein said first detonable propellant composition is comprised of the major ingredients of ammonium perchlorate, aluminum, cyclotrimethylenetrinitramine, binder of hydroxyl terminated polybutadiene, and curing agent of a diisocyanate, and wherein said second detonable propellant composition is comprised of the major ingredients of ammonium nitrate, binder of hydroxyl terminated polybutadiene, and curing agent of a diisocyanate.

* * * * *